United States Patent [19]

Fest

[11] 3,826,955

[45] July 30, 1974

[54] TIME DELAY RELAY

[76] Inventor: Otto Fest, 2007 Avon Ln., Arlington Heights, Ill. 60004

[22] Filed: Feb. 9, 1973

[21] Appl. No.: 331,241

[52] U.S. Cl. .............................. 317/141 S, 307/293

[51] Int. Cl. .......................................... H01h 47/18

[58] Field of Search .......... 307/269, 293; 317/141 S

[56] References Cited

UNITED STATES PATENTS

| | | | |
|---|---|---|---|
| 3,391,305 | 7/1968 | Bradwin et al. | 317/141 S |
| 3,392,350 | 7/1968 | Griffin | 317/141 S |
| 3,721,908 | 3/1973 | Jursans | 317/141 S |

OTHER PUBLICATIONS

Walter C. Jung, "The IC Time Machine," Popular Electronics, Nov. 1973, pages 54–57.

*Primary Examiner*—L. T. Hix

*Attorney, Agent, or Firm*—Alter Weiss Whitesel & Laff

[57] ABSTRACT

A time delay relay that is digitably programmable for set periods of time with great accuracy. Further, interconnections of the leads extending from a time delay relay base causes the time delay relay to operate as a flip-flop device, or as a pulse source in addition to its time delay function.

11 Claims, 1 Drawing Figure

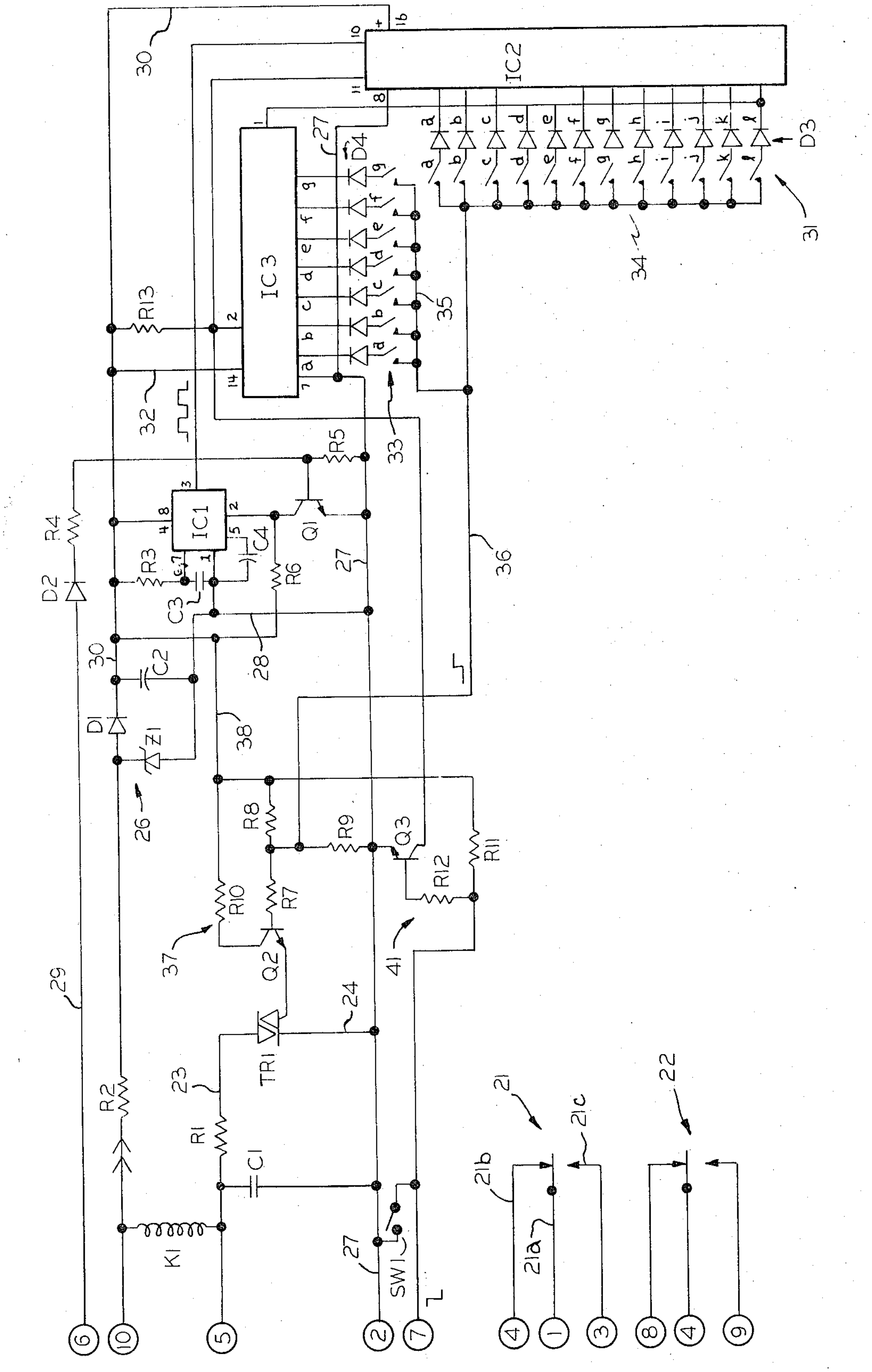

TIME DELAY RELAY

This invention is concerned with electromechanical and electronic control devices, and more particularly, with those devices commonly called time delay relays.

Time delay relays are well known in the art. They are used for either opening or closing circuits after a certain desired time has past. Generally, the time operation of the time delay relay is derived from timing circuits such as resistor-capacitor networks. The variation in time is obtained, for example, by varying either the capacitors or the resistors. If the variation, in the capacitor or resistor, is made by switching in different capacitors or different resistors, then the time delay relay operates in steps. If the variation is made by operating wipers or sliding contacts to vary either the resistance or capacitance, then the variation is made on an analog basis.

A major problem with time delay relays of this type is with the accuracy of the variable time delay. The inaccuracy is caused by various factors, among which are the difficulties of accurately setting the sliding contacts and the changing values of the resistance and capacitance.

A further inadequacy of the presently available time delay relays is the lack of range available in the amount of time delay.

Yet another problem arising with presently available time delay relays is the lack of versatility of the time delay relay. Thus, for the most part, they can only be used to provide a time delay either for turning on or off a given circuit.

Accordingly, an object of the present invention is to provide a new and unique time delay relay.

Another object of the present invention is to provide a time delay relay that is not falsely operated by the noise pulses and/or spikes normally encountered in industrial environment.

Yet another object of the present invention is to provide a time delay relay which obtains the time delay using binary counters.

Still another related object of the present invention is to provide a time delay relay that can also function as a flip-flop circuit or as a pulsing circuit.

Still another object of the present invention is to provide a time delay relay that operates on the frequency dividing principle and derives time means from the power line time base.

In accordance with one embodiment of the present invention, the alternating current power is connected to a regulated power supply to provide direct current. The rectified output of the regulated power supply is fed into a bridging storage capacitor of a closed loop modified circuit having an RC network that is chosen to provide a time constant that is a function of the line frequency being used. The storage capacitor bridges an integrated monostable pulse generator circuit.

The integrated circuit is controlled by a transistorized circuit and starts the timing when the transistor is saturated. The output of the integrated circuit then goes high. When the storage capacitor is charged, the output of the integrated circuit goes low. The change from high to low is fed into a multi-stage binary counter.

A plurality of switches at the outputs of binary counters determines the count of the multi-stage binary counter that is used to operate an output power relay which also determines the time period of the time delay. The output of the first binary counter may be fed into a second binary counter to increase the time delay. The output of the binary counters operate transistorized circuitry for controlling a triac or some other switching means that in turn controls the actual time delay relay. The rectified portion of the pulse can be connected to cause the time delay relays to function in either flip-flop modes or pulsing modes as well as in timing modes.

The above mentioned and other objects of this invention, together with the manner of obtaining them, will become more apparent, and the invention itself will be best understood by making reference to the following description of a preferred embodiment of the invention taken in conjunction with the accompanying drawing, which, in schematic form, shows the unique circuitry for the digitally programmable time delay relay.

The timed delay relay itself, in a preferred embodiment of this invention, comprises a plurality of make and break contacts, two of which are shown schematically at 21 and 22. Both contacts 21 and 22 are shown as single pole double throw contacts. For example, contacts 21 comprise the armature 21*a*, normally closed stator 21*b* and normally open stator 21*c*. While single pole double throw contacts are shown, it should be understood that they are illustrative only and other types of contacts could be provided on the relay.

The coil of the relay is indicated as K1 and is normally attached between pins 5 and 10 on the time delay relay container. Pin 10 is connected to the alternating current source. Pin 5 at the other side of coil K1 is coupled to pin 2 through switching means, such as triac TR1 and lines 23 and 24. The other side (ground) of the alternating current source is connected to pin 2. High pass filter means is coupled in series with the coil to pass high frequency noise components on the AC line which might otherwise falsely trigger the relay. More particularly, a capacitor C1 is coupled between the junction of coil K1 and pin 5 and the AC common. A resistor R1 is coupled from the junction of capacitor C1 and coil K1 and in series with the switching means.

The high side of the alternating current line is connected through a dropping resistor R2 to a direct current power supply 26. The power supply shown is a regulated half wave rectified circuit. The circuit includes diode D1 and capacitor C2. Bridging the capacitor C2 and diode D1 is the regulating zener diode Z1. The junction of capacitor C2 and the zener diode Z1 is connected to the alternating current common through line 28.

Means are provided for generating a square wave pulse that is unaffected by spikes aand line noises normally present in industrial environments. More particularly, a monostable integrated circuit vibrator IC1, is provided. The monostable generates a high going pulse at its output terminal 3 responsive to a low going pulse at its input terminal 2. Thus, the output of IC1 is not affected by line signal spikes. The multivibrator is reset by a high at its input pins 6, 7; so that if a periodic high is applied to IC1 pins 6, 7 and a periodic low is applied to IC1 pin 2, the output of circuit IC1 is a square wave.

Means are provided for generating a periodic high going pulse at the input 6, 7 of integrated circuit IC1.

More particularly, the output of the regulated power supply at the positive going diode D1 is fed through conductor 30, resistor R3 to pins 6, 7. The junction of resistor R3 and pins 6, 7 is connected to alternating current ground 27 through capacitor C3. The time constant of the series resistor R3 and capacitor C3 is a function of the line frequency. Thus, in one particular embodiment of the invention when the capacitor reaches a predetermined 90 percent of the line frequency; the high required on pins 6, 7 to reset the monostable multi-vibrator is achieved.

A filter capacitor C4 is provided between input pins 1 and 5 of IC1 and pin 1 is connected to ground.

Means are provided to apply a low going pulse to input 2 of integrated circuit 1 to initiate the timing response and provide a high going pulse at the output of circuit IC1. More particularly, lead 29 connects a pin 6 of the time delay relay container to positive going diode D2. The output of the positive going diode D2 is coupled to a voltage divider comprising resistors R4 and R5 connected to alternating current common 27. The junction point of resistors R4 and R5 is tied to the base of an NPN transistor Q1.

Transistor Q1 is normally in the non-conducting condition. The emitter of Q1 is coupled directly to alternating current common bus 27. The collector of transistor Q1 is connected directly to input 2 of integrated circuit. The collector of transistor Q1 is biased through resistor R6 to the direct current output of power supply 26 at line 30.

The base of transistor Q1 goes positive at the positive half cycle of the alternating current and the transistor saturates to connect input 2 to AC common bus 27. This is the requisit low going pulse that initiates the timing of the integrated circuit IC1. The output of IC1 goes high until capacitor C3 charges sufficiently to reset integrated circuit IC1 and the entire cycle repeats itself as long as pin 6 and pin 10 are tied to the source of alternating current.

Means are provided for counting the pulses derived from circuit IC1. More particularly, the first and the second binary counters IC2 and IC3, respectively, are provided. The output 3 of IC1 is coupled to the input 10 of IC2. Direct current posivoltage from power supply 26 is supplied to binary counter IC2 at its input 16 over the positive direct current line 30. Ground is coupled to input 8 of circuit IC2 over bus 27.

Means are provided for utilizing a desired count from the counters. Counter IC2, in a Preferred embodiment of this invention, is a 14 stage binary counter equipped with 12 switches at each of its 12 outputs. The 12 switches are shown as switches 31 *a* - 31 1. The stator of each of the switches are tied together. The switches are normally open and when a particular count is wanted, the switch at the desired count's output is closed. Thus, if the third count is wanted, the armature of switch 31c (the third switch) is operated to the closed position.

Means are provided for isolating the outputs, More particularly, a diode is provided at each of the outputs of each of the counters. Thus, IC2 is equipped with diodes generally shown as D3 and individually shown as D3 a - D3 1 corresponding to the output of the switches outputs of binary counter IC2.

Output 1 of circuit IC2 is tied to the input pin 1 (one) of the second binary counter IC3. Positive voltage is connected to input pin 14 of circuit IC3 through lead 32 connected to lead 30. Counter IC3 is shown as having outputs *a* - *g*. The outputs are isolated by means such as blocking diodes shown generally as D4, but applied at each of the outputs and designated as D4 *a* - D4 *g*. Similarly, each of the individual outputs is equipped with a switch 33*a* - 33*g*. The armatures of the switches are normally open and the stators of the switches are tied together by a common line 35 just as the stators of switch 31 are tied together by a common line 34.

The outputs of each of the counters are normally low and when a count reaches a certain output then that output goes high. The AC common bus is tied into circuit IC3 through its input 7 and bus 27.

Means are provided for switching the triac TR1 to a conducting condition responsive to reaching the required count. More particularly, if it is desired to switch triac TR1 to a conducting condition responsive to the third pulse of the square wave generated by circuit IC1 and its associated transistor and timing circuit when switch 31*c* is operated to the closed position. When the desired pulse is at the input 10 of circuit IC2 the output *c* of circuit IC2 goes high. The output c is coupled to line 36 through common stator lead 34. When the last stage output of IC2 goes high and then low, this pulse is transferred to input pin 1 of IC3. Every time a pulse is applied to pin 1 of IC3 the counter advances one position internally so that when the count is transferred to position *c*, pin *c* of IC3 goes high.

The high going output is used to actuate a transistorized control circuit 37. The transistorized control circuit 37 comprises a normally non-conducting NPN transistor Q2. The base of transistor Q2 is tied to the alternating current common bus 27 through resistors R7 and R9. The junction of resistors R7 and R9 is coupled to positive voltages at the line 30 through the resistor R8 and line 38.

The collector of transistor Q2 is tied to positive line 30 through resistor R10 and line 38.

The emitter of transistor Q2 is tied directly to the control input of the triac TR1. The values of resistors R7 through R10 are such that when the high is applied to the junction of resistors R7 and R9, transistor Q2 saturates. When transistor Q2 conducts, it causes triac TR1 to likewise conduct which in turn energizes relay coil K1.

Means are provided for resetting the counters and the triac to its normally non-conducting condition. More particularly, a reset transistorized circuit, generally shown as 41 is provided. Circuit 41 comprises normally conducting NPN transistor Q3. The base of transistor Q3 is tied to the positive output of line 30 of the regulated power supply 26 through resistors R11 and R12 in series and lead 38. The emitter of transistor Q3 is coupled directly to the alternating current common line bus 27. The collector of transistor Q3 is coupled into inputs 2 of circuit IC3 and 11 of circuit IC2. These inputs are also connected to the positive direct current line 30 through resistor R13.

Switching transistor Q3 to its non-conducting condition causes reset pins 2 and 11 of circuits IC3 and IC2 respectively to be disconnected from the AC common bus 27 and to be connected to positive DC voltage through resistor R13. This high going input resets the counters. The resetting of the counter puts a low going pulse on line 36 and returns transistor Q2 to its normally non-conducting condition and consequently turning triac TR1 to its non-conducting condition to de-energize the coil K1 of the time delay; thereby resetting the whole circuit.

To operate the time delay relay circuitry in the time delay mode, pin 6 of the time delay relay container is externally connected to pin 5 of the time delay relay circuitry. This enables the AC current to flow from pin 10 through coil K1, pin 5, pin 6 and be rectified by diode D2. Transistor Q1 is operated to its conducting condition by the rectified half cycle coupled to the voltage divider resistor R4 and R5 as previously explained The current flow through coil K1, however, is insufficient to operate the time dealy relay through diode D2 and the voltage divider circuitry.

If a time delay is required equivalent to 1.066 seconds (63 cycles on the power line) then switch *e* of IC2 is closed. The binary counter circuit IC2 operates as previously described; that is, the power supply 26 provides a half wave rectified DC source that acts to charge capacitor C3 at each positive portion of the alternating current input. Transistor Q1 conducts to start the timing of the monostable circuit IC1. When capacitor C3 is charged sufficiently, the circuit IC1 is reset. When 63 pulses have been counted, then the output e of IC2 goes high. Since switch 31*e* is closed, the high is carried through conductor 36 to the junction of resistors R7, R8 and R9 to effectively cause Q2 to conduct. When conducting, the transistor Q2 connects the output of the power supply to the control lead of the triac. Thereby causing the triac to conduct. Then sufficient current flows through coil K1 to operate the time delay relay. A circuit connected to pins 1 and 3 of the time delay relay container at this time, would be completed when armature 21*a* operates so that pins 1 and 3 are connected.

The operation of the triac connects pin 5 to alternating current common pin 2. Since pin 6 is tied to pin 5, pin 6 is now tied to the common so that there is no positive pulse applied to the base of transistor Q1 and therefore transistor Q1 does not apply any low going pulse to the input 2 of the circuit IC1. In this condition when the circuit IC1 is reset by the charging of C3 it does not get set again. Thus, there is no pulse output from integrated circuit IC1 for the counters to count. Relay K1 coil, thus, remains energized until it is reset. Resetting is accomplished at this time by operating switch SW1 to connect pin 7 to pin 2, or the alternating current common bus 27. When switch SW1 is in its closed position, the base of transistor Q3 is at the same voltage as its emitter and thus, the normally conducting transistor Q3 goes into its non-conducting condition, enabling the high going signal through R13 to reset the counter circuits IC3 and IC2 at their inputs 2 and 11 respectively. When the counters are reset the high is removed from the base of transistor Q2 thereby returning transistor Q2 to its non-conducting condition. With transistor Q2 in its non-conducting condition, triac TR1 is turned off and current no longer flows through coil K1. The time delay relay thereby returns to its normally unoperated condition.

To operate the time delay relay circuitry in its flip-flop mode, pin 6 is connected to pin 10. Assuming that switch 33*e* is operated to its closed position, then the circuitry of IC1 will operate on the same manner as previously discussed to generate the square wave that will be counted. At the 63rd pulse, the transistor Q2 will be operated to its conducting condition, be saturated and begin to conduct to cause triac TR1 to operate to its conducting condition thereby energizing relay coil K1. However, with pin 6 connected to pin 10, pulses continue to be applied to the base of transistor Q1 so that the counting continues. On the 126th pulse therefore the high is removed from the output of counter IC2 to therefore cause transistor Q2 to go back to its normally non-conducting state and triac TR1 to its non-conducting state. The pulses continue when output *e* agains goes high and the coil K1 is energized as previously. Thus, the circuitry is in a flip-flop mode.

For a pulse mode, pin 6 is tied to pin 10 as with the flip-flop mode, but more than one switch is operated at the same time. In this mode, the number of pulses will be determined by the smallest delay switches energized, and the pulsing period will be determined by the summation of all delays switches activated. The switches that are operated determine the on-off cycle time of the pulses produced by the energization and de-energization of coil K1.

The integrated circuitry IC1, IC2 and IC3 are commercially available and the following are used in one preferred embodiment:

| | | |
|---|---|---|
| IC1 | Signetics | NE555 |
| IC2 | RCA | CD4020 |
| IC3 | RCA | CD4024 |

While the principles of the invention have been described above in connection with specific apparatus and applications, it is to be understood that this description is made only by way of example and not as a limitation on the scope of the invention.

I claim:

1. A time delay relay circuit for energizing a relay coil after certain time lapses for desired time periods, said circuit comprising switching means in series with the relay coil between the high and the low side of an alternating current source, pulse generating means for generating a series of pulses having a certain frequency, direct current source means, said direct current source means connected between the alternating current source and said pulse generating means whereby said pulse generating means generates pulses that are a function of the frequency of the alternating current source so that said certain frequency is a function of the frequency of the alternating current source, frequency dividing means operated responsive to said pulses for generating control signals after a certain time lapse that is a function of said certain frequency, said frequency dividing means comprising counter means having a plurality of outputs that are sequentially operated respectively responsive to the counts derived from counting the pulses generated by said pulse generating means so that a control signal appears at each output at a different time, and control means operated responsive to one of said control signals selected to provide the desired time period for operating said switching means to energize said relay coil.

2. The time delay relay circuit of claim 1 wherein reset means are provided for resetting said frequency dividing means to remove said control signals.

3. The time delay relay circuit of claim 2 wherein said pulse generating means comprises a monostable multi-vibrator, timing circuit means for operating said monostable multi-vibrator to its stable condition, and means for periodically resetting said monostable multi-vibrator thereby generating square wave pulses.

4. A time delay relay circuit for energizing relay coil after certain time lapses for desired time periods, said circuit comprising switching means in series with the relay coil between the high and the low side of an alternating current source, pulse generating means for generating a series of pulses having a certain frequency, said pulse generating means comprising a monostable multi-vibrator, timing circuit means for operating said monostable multi-vibrator to its stable condition, means for periodically resetting said monostable multi-vibrator thereby generating square wave pulses, said monostable multi-vibrator comprising integrated circuit means, said timing means being coupled to the non-inverting input of the integrated circuit, direct current source means connected between said timing means and the alternating current source whereby said timing means operates as a function of the frequency of the alternating current source, said means for resetting said monostable multi-vibrator being connected between the inverting input of said integrated circuit means and the low side of said alternating current source, reset means for resetting the frequency dividing means to remove said control signals, and coupling means for coupling a synchronous signal to operate said means for resetting said monostable multi-vibrator.

5. The time delay relay circuit of claim 4 wherein said means for resetting said monostable multi-vibrator comprises first transistor means with the emitter coupled to the low side of the alternating current and the collector to the inverting input of said integrated circuit means, and said synchronous signal being coupled to the base of the first transistor means, whereby the first transistor means conducts responsive to said synchronous signal.

6. The time delay relay circuit of claim 5 wherein said synchronous signal coupling means comprises first rectifying means, and means for connecting said first rectifying means to the high side of said alternating current source through said relay coil at the junction of said switching means and said coil.

7. The time delay relay circuit of claim 3 wherein said frequency dividing means comprises counter means connected to the output of said multi-vibrator means to provide said control signals after a desired count of pulses has been reached.

8. The time delay relay circuit of claim 7 wherein said counter means comprises a plurality of output terminal means, and switch means for selectively connecting desired ones of said output terminals by operating said switch means for connecting said selected counter output terminal means to said control means.

9. The time delay relay circuit of claim 8 wherein said counter means comprises a first and a second counter, and means for connecting the input of said second counter to the last output terminal means of said first counter.

10. The time delay relay circuit of claim 9 wherein said direct current source means comprises rectifier means connected to the high side of said alternating current source whereby said time delay relay operates as a flip-flop circuit or a pulse source depending on the condition of the counter switch means.

11. The time delay relay circuit of claim 7 wherein said control means comprises a normally non-conducting second transistor operated to conduct by said control signals from said counter means, wherein said switching means comprises triac means, and means responsive to the conducting control means for applying positive signals to the gate of said triac means.

* * * * *

UNITED STATES PATENT OFFICE

CERTIFICATE OF CORRECTION

Patent No. 3,826,955 Dated July 13, 1974

Inventor(s) Otto Fest

It is certified that error appears in the above-identified patent and that said Letters Patent are hereby corrected as shown below:

| | |
|---|---|
| Col. 2, line 55 | After "spikes" cancel "aand" insert instead -- and -- |
| Col. 3, line 17 | After "connects" delete "a" |
| line 34 | Change "requisit" to -- requisite -- |
| Col. 4, line 20 | Before "switch" change "when" to -- then -- |
| Col. 5, line 12 | After "time" change "dealy" to -- delay -- |

Signed and sealed this 26th day of November 1974.

(SEAL)
Attest:

McCOY M. GIBSON JR.
Attesting Officer

C. MARSHALL DANN
Commissioner of Patents